US010929645B2

(12) United States Patent
Takayama (10) Patent No.: US 10,929,645 B2
(45) Date of Patent: Feb. 23, 2021

(54) IMAGE PROCESSING APPARATUS, IMAGE PROCESSING METHOD, AND STORAGE MEDIUM (71) Applicant: CANON KABUSHIKI KAISHA, Tokyo (JP)

(72) Inventor: Masahiro Takayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 15/980,549

(22) Filed: May 15, 2018

(65) Prior Publication Data
US 2018/0341804 A1 Nov. 29, 2018

(30) Foreign Application Priority Data
May 25, 2017 (JP) .............................. JP2017-103404

(51) Int. Cl.
G06K 9/00 (2006.01)
G06T 7/90 (2017.01)
G06T 5/00 (2006.01)
G06T 7/11 (2017.01)
G06K 9/46 (2006.01)

(52) U.S. Cl.
CPC ....... *G06K 9/00234* (2013.01); *G06K 9/4652* (2013.01); *G06K 9/4661* (2013.01); *G06T 5/008* (2013.01); *G06T 7/11* (2017.01); *G06T 7/90* (2017.01); *G06T 2207/10024* (2013.01); *G06T 2207/20012* (2013.01); *G06T 2207/30088* (2013.01); *G06T 2207/30196* (2013.01); *G06T 2207/30201* (2013.01)

(58) Field of Classification Search
None
See application file for complete search history.

(56) References Cited

U.S. PATENT DOCUMENTS

| 8,121,404 | B2* | 2/2012 | Xiao | G03B 7/091 |
| | | | | 382/167 |
| 8,483,507 | B2* | 7/2013 | Kubota | H04N 5/772 |
| | | | | 382/274 |
| 9,811,888 | B2* | 11/2017 | Matsunaga | G06T 5/005 |
| 2005/0271295 | A1* | 12/2005 | Tabata | G06T 5/002 |
| | | | | 382/274 |
| 2015/0139534 | A1* | 5/2015 | Komatsu | G06T 7/536 |
| | | | | 382/154 |
| 2018/0205879 | A1* | 7/2018 | Imai | H04N 5/232933 |
| 2018/0350048 | A1* | 12/2018 | Tada | G06T 5/008 |

FOREIGN PATENT DOCUMENTS

| JP | 2005242535 A | * | 9/2005 | |
| JP | 2005-327009 A | | 11/2005 | |
| JP | 2005327009 A | * | 11/2005 | ............. G06T 5/002 |

* cited by examiner

*Primary Examiner* — Iman K Kholdebarin
(74) *Attorney, Agent, or Firm* — Canon U.S.A., Inc. IP Division

(57) ABSTRACT

In an image processing apparatus, a face detection unit detects a face area from an input image, and an image processing unit extracts a high luminance area from the face area to generate a correction amount of the high luminance area and corrects the high luminance area using the correction amount. Then, in a case where a plurality of face areas is detected, the image processing unit adjusts the correction amount based on feature information of the plurality of face areas.

17 Claims, 10 Drawing Sheets

IMAGE PROCESSING APPARATUS, IMAGE PROCESSING METHOD, AND STORAGE MEDIUM

BACKGROUND

Field of the Disclosure

The present disclosure relates to an image processing apparatus that processes a captured image, an image processing method, and a storage medium.

Description of the Related Art

An image capturing apparatus such as a digital camera conventionally acquires a captured image of proper exposure by controlling a quantity of incident light from a subject or the like through an adjustment of a diaphragm of a camera or an adjustment of a shutter speed. In an image in which, for example, a person is captured as a subject, even if the subject is captured through optimum exposure control, shine may arise in a face area under the influence of an ambient light source, flash light or the like. The shine is a phenomenon in which a portion of the skin is imaged in white (overexposed) due to loss of color information after an ambient light source or flash light is reflected by the surface of the skin or the like of a person as a subject, and a value of an input signal captured by an image capturing apparatus is saturated. If shine arises in an area of skin color and a locally high luminance portion exists, unfavorable impressions may be given as a person image. Therefore, there is a demand for a correction technology where, with respect to an image having a saturated area in which an input signal value is saturated (an area in which shine arises), the shine can be reduced by correction of such saturation.

In response to such a demand, Japanese Patent Application Laid-Open No. 2005-327009 discusses a technology where a predetermined part such as a face, an eye, or a mouth of a person is detected as a subject and the degree of correction of each pixel is determined based on a position or a color of the predetermined part. Accordingly, only the part where shine of the skin arises and whose luminance needs to be lowered can be corrected, while high luminance and high brightness of a part whose luminance and brightness do not need to be lowered are maintained.

SUMMARY

According to an aspect of the present invention, an image processing apparatus including at least one processor, and at least one memory, wherein the at least one processor functions, based on data stored in the at least one memory, as units including a detection unit configured to detect an image region of a predetermined subject from an input image, and a correction unit configured to extract a high luminance area from the image region of the predetermined subject to generate a correction amount of the high luminance area and to perform correction processing on the high luminance area using the correction amount, wherein, in a case where a plurality of the image regions is detected from the input image, the correction unit adjusts the correction amount generated for the high luminance area based on feature information of the plurality of image regions.

Further features of the present invention will become apparent from the following description of exemplary embodiments with reference to the attached drawings.

DESCRIPTION OF THE EMBODIMENTS

Hereinafter, an exemplary embodiment of the present invention will be described in detail based on the accompanying drawings.

An image processing apparatus according to an exemplary embodiment of the present invention is applicable to various information terminals such as a smartphone, a tablet terminal, and a personal computer including a function of a digital still camera, a digital video camera, or a digital camera and various cameras such as an industrial camera, an in-vehicle camera, and a medical camera. In the present exemplary embodiment, an example will be cited and described in which an image processing apparatus according to an exemplary embodiment of the present invention is applied to a digital still camera (hereinafter, simply referred to as a digital camera).

Figure 1:
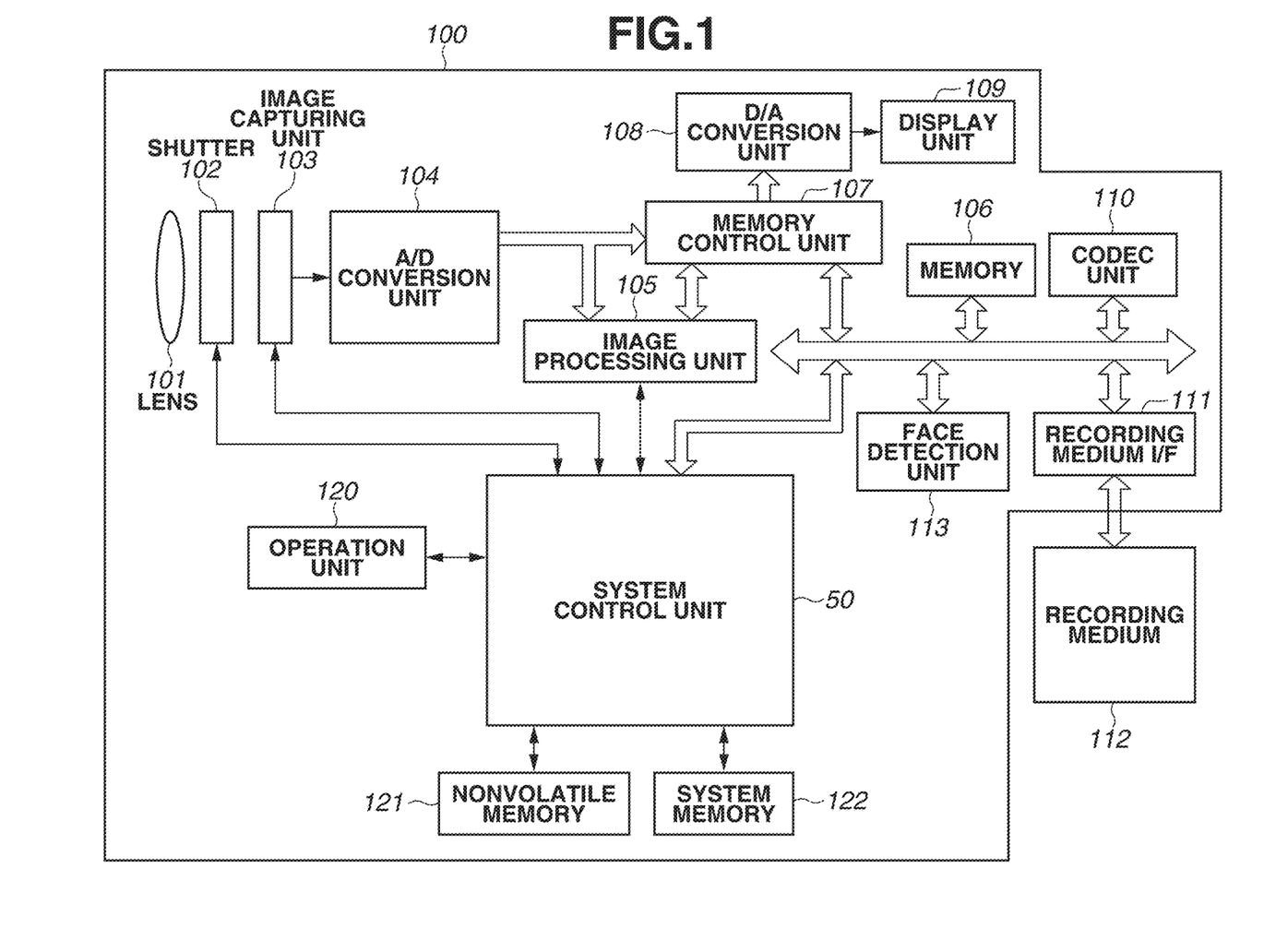
FIG. 1 is a diagram illustrating a schematic configuration example of a digital camera according to the present exemplary embodiment.

FIG. 1 is a block diagram illustrating a schematic configuration example of a digital camera 100 as an application example of an image processing apparatus according to the present exemplary embodiment.

A lens group 101 is a zoom lens including a focus lens. A shutter 102 includes an aperture function and adjusts a quantity of incident light into an image sensor included in an image capturing unit 103 and an exposure time under the control of a system control unit 50. The image capturing unit 103 converts an optical image formed on an imaging plane of the image sensor via the lens group 101 into an electrical signal by photoelectric conversion and outputs an analog image signal. The image sensor of the image capturing unit 103 is a charge coupled device (CCD) image sensor or a complementary metal oxide semiconductor (CMOS) image sensor. In front of the imaging plane of the image sensor, color filters corresponding to each color component of red (R), green (G), and blue (B) as three primary colors are provided in an array called a Bayer array for each pixel. Thus, an analog image signal constructed of color signals of each pixel of RGB corresponding to the Bayer array is output from the image capturing unit 103. An analog-to-digital (A/D) conversion unit 104 converts the analog image signal output from the image capturing unit 103 into digital image data and outputs the image data to an image processing unit 105.

The image processing unit 105 performs various kinds of image processing such as a white balance adjustment and a gamma (γ) correction on image data captured by the image capturing unit 103 and output by the A/D conversion unit 104 or image data read by a memory control unit 107 from a memory 106. Also, the image processing unit 105 performs predetermined evaluation value calculation processing using face detection results obtained by a face detection unit 113 or captured image data. The calculated value obtained by the predetermined evaluation value calculation processing is sent to the system control unit 50 as an evaluation value used for exposure control and ranging control. In this case, the system control unit 50 executes the exposure control and ranging control based on the evaluation value, whereby auto focus (AF) processing, auto exposure (AE) processing, and auto while balance (AWB) processing of the through the lens (TTL) method are performed, for example. In the present exemplary embodiment, if a high luminance shine area exists in an image region of a predetermined subject appearing in a captured image, the image processing unit 105 also performs, as will be described below, shine correction processing on the shine area.

A codec unit 110 performs compression encoding and decoding on image data. The codec unit 110 encodes or decodes image data stored in the memory 106 in a format conforming to the standard like, for example, the Moving Picture Experts Group (MPEG).

The face detection unit 113 detects an area where a person's face appears in an image by performing predetermined image analysis processing on image data captured by the image capturing unit 103 and output by the A/D conversion unit 104 or image data read by the memory control unit 107 from the memory 106. Data of face detection results detected by the face detection unit 113 is temporarily stored in the memory 106 via the memory control unit 107 and, if necessary, read from the memory 106 and sent to the image processing unit 105.

In addition to temporarily storing image data when the image processing unit 105 performs various kinds of image processing, the memory 106 stores, for example, image data read from a recording medium 112 via a recording medium interface (I/F) 111 or image data to be displayed on a display unit 109. The memory control unit 107 controls reading and writing of the memory 106. A digital-to-analog (D/A) conversion unit 108, for example, converts image data for image display read by the memory control unit 107 from the memory 106 into an analog video signal and outputs the analog video signal to the display unit 109.

The display unit 109 includes a display device such as a liquid crystal display (LCD) and displays a captured image, an image read from the recording medium 112, a live view image captured by the image capturing unit 103 during live view display. In addition, a user interface image when a user operates the digital camera 100, for example, is displayed in the display unit 109. An operation unit 120 includes a touch panel that displays the above user interface image, a button, and a switch, detects a user's operation, and notifies the system control unit 50 of detected operation information.

The system control unit 50 includes a central processing unit (CPU) or a micro processing unit (MPU), and controls each function of the digital camera 100 according to the present exemplary embodiment as a whole by expanding a program stored in a nonvolatile memory 121 into a work area of a system memory 122 to execute the program. The nonvolatile memory 121 includes a nonvolatile semiconductor memory such as an electrically erasable programmable read-only memory (EEPROM) that stores a program and a parameter as an auxiliary storage device. In addition to expanding a program or the like read from the nonvolatile memory 121, the system memory 122 stores a constant and a variable for an operation of the system control unit 50 as a main storage device. The recording medium I/F 111 mechanically and electrically connects the recording medium 112, which is detachable, such as a semiconductor memory card or a card-type hard disk to the digital camera 100.

Figure 2:
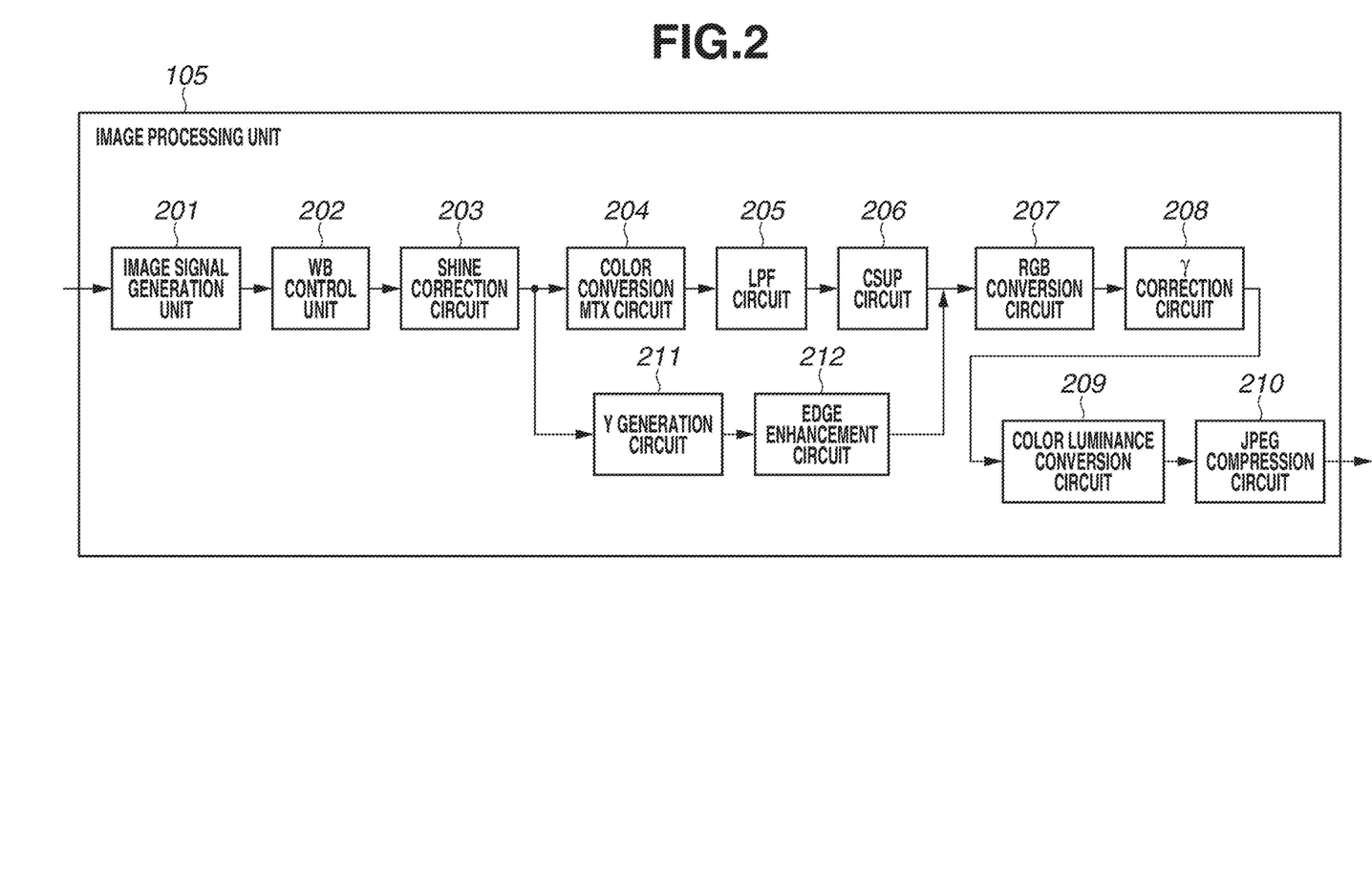
FIG. 2 is a diagram illustrating a detailed configuration example of an image processing unit.

Hereinafter, a detailed configuration of the image processing unit 105 and details of image processing performed by the image processing unit 105 will be described with reference to FIG. 2.

Image data captured by the image capturing unit 103 and output by the A/D conversion unit 104 is input into an image signal generation unit 201 of the image processing unit 105. The image data includes, as described above, data of each color of RGB constructed in the Bayer array. The image signal generation unit 201 generates image data including each color of RGB per pixel by performing synchronization processing on the image data of each color of RGB corresponding to the Bayer array. The image signal generation unit 201 outputs the image data generated through the synchronization processing to a white balance control unit 202 (hereinafter, referred to as the WB control unit 202).

The WB control unit 202 calculates a white balance correction value (hereinafter, referred to as the WB correction value) based on the image data output by the image signal generation unit 201. Then, the WB control unit 202 corrects the white balance of the image data using the calculated WB correction value.

A shine correction circuit 203 performs the shine correction processing based on the image data whose white balance has been corrected by the WB control unit 202. Details of the shine correction processing performed by the shine correction circuit 203 will be described below. The image data on which the shine correction processing has been performed by the shine correction circuit 203 is sent to a color conversion matrix circuit 204 (hereinafter, referred to as the color conversion MTX circuit 204) and a Y generation circuit 211.

The color conversion MTX circuit 204 multiplies the image data whose shine has been corrected by the shine correction circuit 203 by a color gain so that the image data is reproduced in optimum colors, and then converts the image data into two pieces of color difference data R-Y and B-Y. The two pieces of color difference data R-Y and B-Y output from the color conversion MTX circuit 204 are sent to a low-pass filter circuit 205 (hereinafter, referred to as the LPF circuit 205). The LPF circuit 205 limits a band of the color difference data R-Y and B-Y, and outputs, to a chroma suppress (CSUP) circuit 206, the color difference data R-Y and B-Y whose bands have been limited. The CSUP circuit 206 performs processing to suppress a false color signal of a saturated part of the color difference data R-Y and B-Y whose bands have been limited by the LPF circuit 205. The color difference data R-Y and B-Y after the false color signal suppression by the CSUP circuit 206 are output to an RGB conversion circuit 207.

The Y generation circuit 211 generates luminance data Y from the image data on which the shine correction processing has been performed by the shine correction circuit 203. The luminance data Y generated by the Y generation circuit 211 is sent to an edge enhancement circuit 212. The edge enhancement circuit 212 performs edge enhancement processing on the luminance data Y and outputs the luminance data Y on which the edge enhancement processing has been performed to the RGB conversion circuit 207.

The RGB conversion circuit 207 performs RGB conversion processing for generating RGB data from the color difference data R-Y and B-Y output from the CSUP circuit 206 and the luminance data Y output from the edge enhancement circuit 212. The RGB data output from the RGB conversion circuit 207 is sent to a gamma (γ) correction circuit 208. The γ correction circuit 208 performs gradation correction processing (γ correction processing) according to predetermined γ characteristics on the RGB data. The RGB data on which the γ correction processing has been performed by the γ correction circuit 208 is converted into image data of YUV by a color luminance conversion circuit 209, and then, compression-encoded by a Joint Photographic Experts Group (JPEG) compression circuit 210. The compression-encoded image data is then recorded in the recording medium 112 in FIG. 1 as an image data file.

Details of shine correction made by the digital camera 100 according to the present exemplary embodiment will be described.

Figure 3:
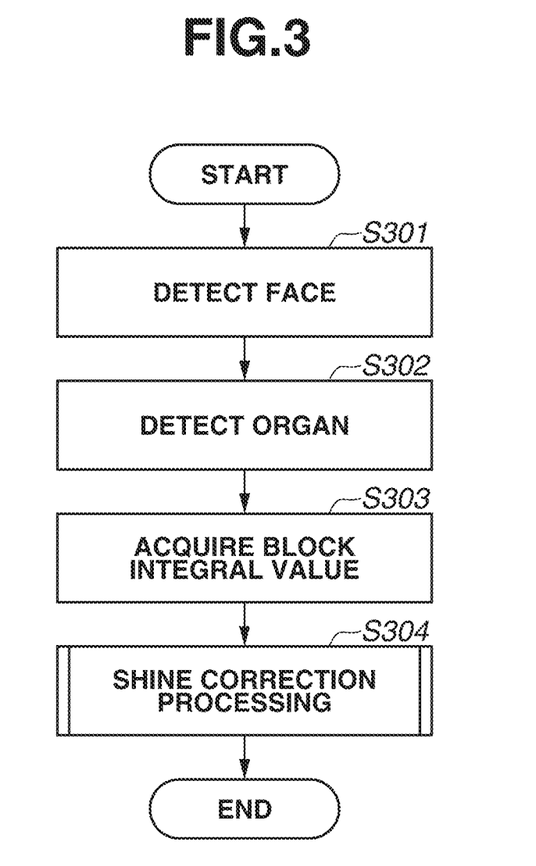
FIG. 3 is a flowchart of processing after detection of a face area until shine correction.

FIG. 3 is a flowchart illustrating a flow of processing of detecting an image region of a predetermined subject from an image captured by the image capturing unit 103 or an image stored in the memory 106 of the digital camera 100, and making shine correction by extracting a shine area from the image region. In the flowchart in FIG. 3, steps S301 to S304 are abbreviated as S301 to S304, respectively. The processing of the flowchart in FIG. 3 can be implemented by a hardware configuration or a software configuration, or a portion thereof can be implemented by a software configuration and the rest by a hardware configuration. When the processing is implemented by the software configuration, the processing of the flowchart in FIG. 3 is implementable, as an example, by a program stored in the nonvolatile memory 121 of FIG. 3 being expanded into the system memory 122 to be executed by the system control unit 50. The program according to the present exemplary embodiment is prepared in the nonvolatile memory 121 in advance, but can also be loaded into the system memory 122 by, for example, reading from a detachable semiconductor memory or downloading from a network like the Internet (not illustrated). This also applies to other flowcharts described below.

In the present exemplary embodiment, an example is cited and described in which a face image of a person is detected as an example of the image region of a predetermined subject from an input image such as a captured image, a high luminance shine area is extracted from the face image, and the shine correction is made on the shine area.

In the digital camera 100 according to the present exemplary embodiment, as the processing of step S301, the face detection unit 113 detects an area of a face image (hereinafter, referred to as the face area) of a person from an image captured by the image capturing unit 103 or an image stored in the memory 106. If a plurality of faces exists in the image, the face detection unit 113 detects a plurality of face areas and acquires information about each of the face areas.

In step S302, the face detection unit 113 detects an area of each organ as each part constituting a face, such as an eye, a mouth, and an eyebrow from the face area detected in step S301. Hereinafter, the area of each organ in a face will be denoted as an organ area. Detecting an organ area from the face area as described above makes it possible to distinguish skin-colored areas and areas of other colors in the face area. That is, organ areas of the eye, the mouth and the like do not generally have a skin color and thus, detecting these organ areas and excluding the organ areas from the face area makes it possible to identify skin-colored areas in the face area. In the present exemplary embodiment, the face detection unit 113 also detects, as detection information of an organ area, coordinate position information of each organ such as the eye or the mouth and information representing reliability of organ detection. Reliability information of the organ detection is, as an example, acquired as information representing the degree of certainty of each organ area of the eye, the mouth and the like based on the shape, inclination, and color of a detected organ area and the position and arrangement relation of the organ area in the face area. If, as an example, an organ area detected as an eye from the face area is at a position where an eye should be located in the face and the shape and color thereof are the shape and color of an eye, the reliability information indicating that the degree of certainty to be an eye is high is obtained. However, the method for acquiring the reliability information is not limited to the above example and information capable of representing the degree of certainty of each organ area can be acquired by other methods. The detection information of an organ area detected in step S302 is temporarily stored in, for example, the memory 106 and then read by the memory control unit 107 under the control of the system control unit 50 before being sent to the shine correction circuit 203 of the image processing unit 105.

In step S303, the face detection unit 113 identifies areas obtained by excluding the organ areas from the face area, that is, skin-colored areas of the face, and further detects a shine area from the skin-colored areas and acquires an evaluation value used for the shine correction made on the shine area, which will be described below.

Figure 4:
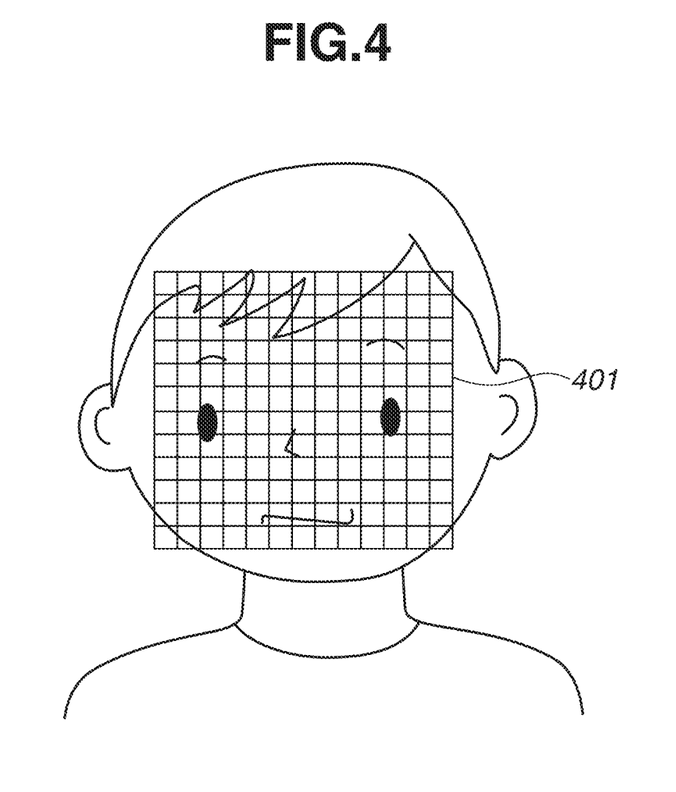
FIG. 4 is a view used to illustrate a detected face area.

FIG. 4 is a view illustrating an example of a face area 401 detected by the face detection unit 113. In step S303, as illustrated in FIG. 4, the face detection unit 113 divides the face area 401 of a person into a plurality of blocks and determines an integral value of pixel values (each value of RGB) for each block. The face detection unit 113 also identifies each block of skin-colored areas by excluding each block of organ areas of the eyes, the mouth and the like detected in step S302, i.e., each block of areas that do not have the skin color from each block of the face area 401. Then, the face detection unit 113 acquires the integral value of each block of the skin-colored areas as an evaluation value used for the shine correction described below. Thus, in step S303, the evaluation value of each block of the skin-colored areas, obtained by excluding areas that do not have the skin color such as the eyes and the mouth from the face area 401, is acquired. The evaluation value of each block of the skin-colored areas acquired in step S303 is temporarily stored in, for example, the memory 106 and then read by the memory control unit 107 under the control of the system control unit 50 before being sent to the shine correction circuit 203 of the image processing unit 105.

As the processing in step S304, the shine correction circuit 203 performs correction processing (shine correction processing) on a shine area (high luminance area) in the skin-colored areas based on the integral value (evaluation value) acquired for each block of the skin-colored areas in step S303. In other words, in step S304, the shine correction circuit 203 extracts a shine area (high luminance area) in the skin-colored areas, and also calculates a skin color evaluation value of the skin-colored areas based on the integral value (evaluation value) acquired for each block of the skin-colored areas in step S303. Then, the shine correction circuit 203 calculates a shine correction amount based on the skin color evaluation value of the skin-colored areas and makes the shine correction on the shine area using the shine correction amount. Details of the calculation processing of the shine correction amount and the shine correction processing on the shine area by the shine correction circuit 203 will be described below.

The shine correction circuit 203 extracts a high luminance area and calculates a skin color evaluation value based on, as will be described below, detection information of organ areas, but can also extract a high luminance area and calculate a skin color evaluation value based on color information and luminance information contained in a face area. For example, the shine correction circuit 203 can acquire only a block integral value of color components close to the skin color in the face area to extract a high luminance area and calculate a skin color evaluation value based on the block integral value of color components close to the skin color.

In the shine correction in the present exemplary embodiment, as described above, a high luminance area is extracted and a skin color evaluation value is calculated for skin-colored areas obtained by excluding organ areas from a face area and a shine correction amount is calculated based on the high luminance area and the skin color evaluation value to make the shine correction. Thus, if, for example, no organ is detected or the organ detection may be in error, it is desirable not to make the shine correction.

Also, if, for example, a plurality of face areas is detected from an input image, the shine correction circuit 203 extracts a high luminance area and calculates a skin color evaluation value from skin-colored areas obtained after organ areas are excluded to calculate a shine correction amount for each face area. However, if the shine correction is made for a face area from which organs could be detected correctly and the shine correction is not made for a face area from which no organ could be detected or a face area for which the organ detection may be in error, a face area on which the shine correction is made and a face area on which the shine correction is not made are mixed. In such a case, an unnatural corrected image with correction nonuniformity may be generated.

Therefore, when a plurality of face areas is detected, the shine correction circuit 203 according to the present exemplary embodiment determines whether each of the face areas is a face area from which an organ is detected without error and on which the shine correction can be made, based on the detection information of the organ areas described above. Then, the shine correction circuit 203 according to the present exemplary embodiment adjusts the shine correction amount calculated for the face areas from which an organ is detected and on which the shine correction can be made based on feature information acquired from the plurality of face areas to make the shine correction using the adjusted shine correction amount. While details will be described below, as the feature information of the face areas used for adjusting the shine correction amount, at least one of size information (size) of the face area, the detection information of the organ areas of a face, and extraction information of the high luminance area is used. While details will be described below, information representing at least the area of the high luminance area is used as the extraction information of the high luminance area and information representing reliability of the detection of each organ is used as the detection information of an organ area.

Hereinafter, details of the calculation of the shine correction amount, an adjustment of the shine correction amount, and the shine correction using the adjusted shine correction amount carried out by the shine correction circuit 203 according to the present exemplary embodiment, when a plurality of face areas is detected from an input image will be described with reference to FIG. 5 and subsequent drawings.

Figure 5:
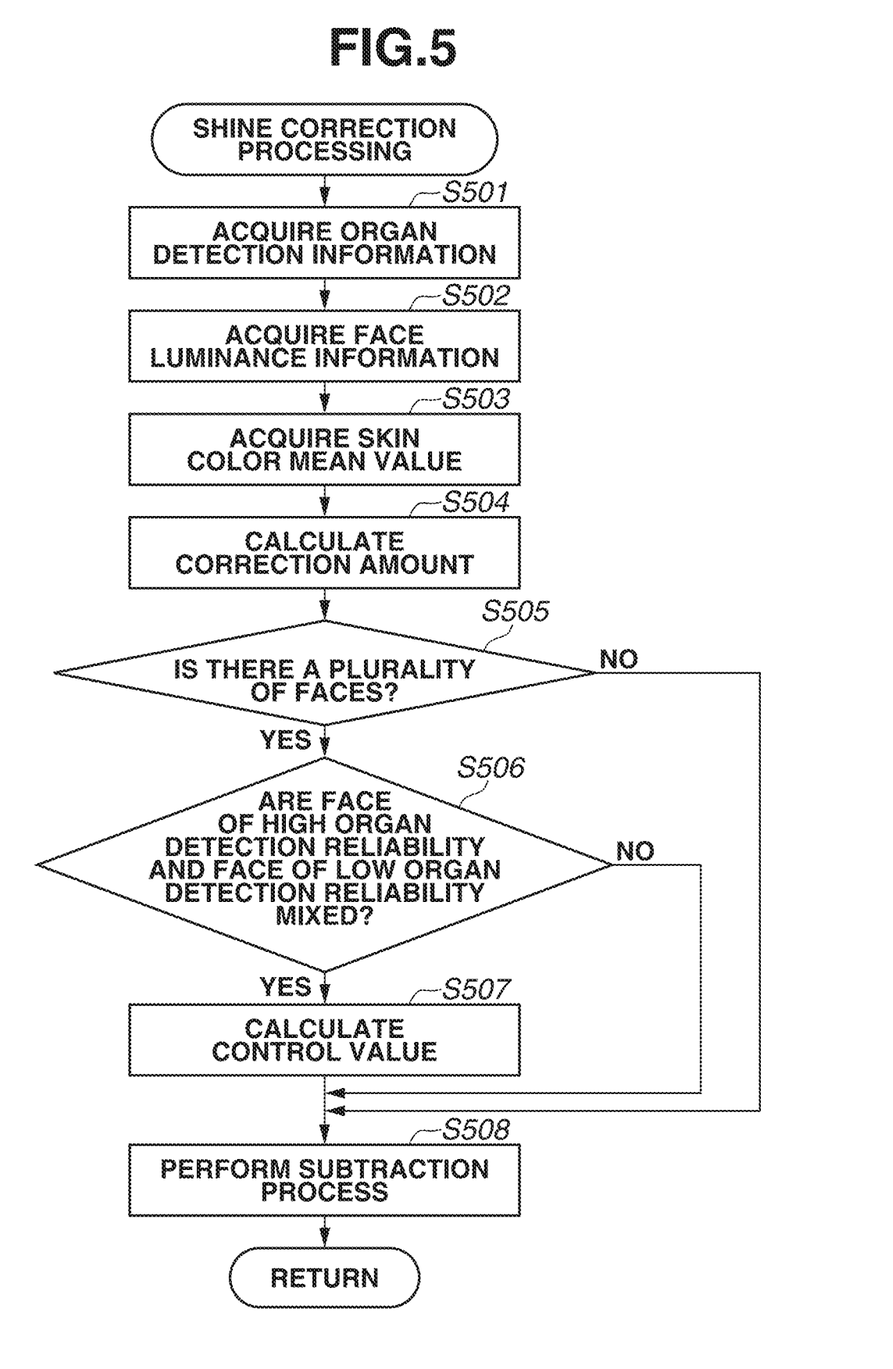
FIG. 5 is a detailed flowchart of shine correction processing according to the present exemplary embodiment.

FIG. 5 is a flowchart illustrating a detailed flow of the shine correction processing performed by the shine correction circuit 203 in step S304 of FIG. 3.

In step S501, the shine correction circuit 203 acquires detection information of the organ area detected in step S302 of FIG. 3. The shine correction circuit 203 at this point acquires coordinate position information of each organ such as the eye or the mouth described above and reliability information of the organ detection as the detection information of the organ area.

In step S502, the shine correction circuit 203 calculates each average pixel value (AveR, AveG, AveB) of RGB from the block integral value acquired in step S303 of FIG. 3 to calculate luminance information (Y) of the face area excluding the organ areas of the eyes, the mouth and the like.

In step S503, the shine correction circuit 203 calculates each skin color mean value (Skin_R, Skin_G, Skin_B) of the face area excluding the organ areas of the eyes, the mouth and the like.

In other words, the shine correction circuit 203 determines the luminance value and the skin color mean value of the skin-colored areas obtained by excluding the organ areas of the eyes, the mouth and the like from the face area 401 through the processing in steps S502 and S503.

In step S504, the shine correction circuit 203 calculates a shine correction amount based on the skin color mean value acquired in step S503, the luminance value of the face area acquired in step S502, and the reliability information of the organ detection acquired in step S501.

Figure 6A:
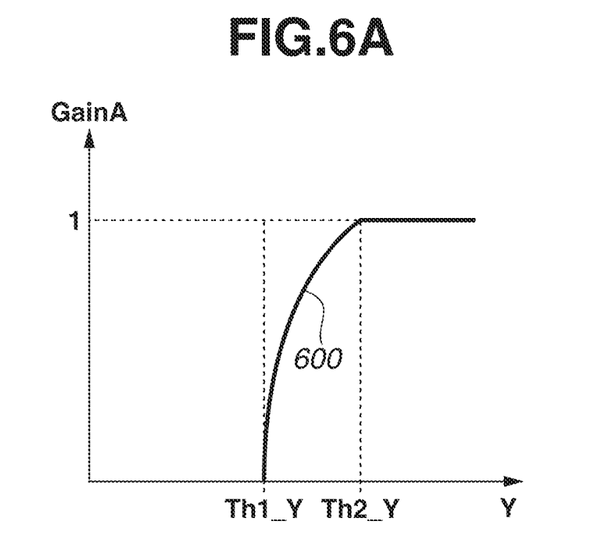
FIGS. 6A and 6B are graphs illustrating gain characteristics when a shine correction amount is determined.
Figure 6B:
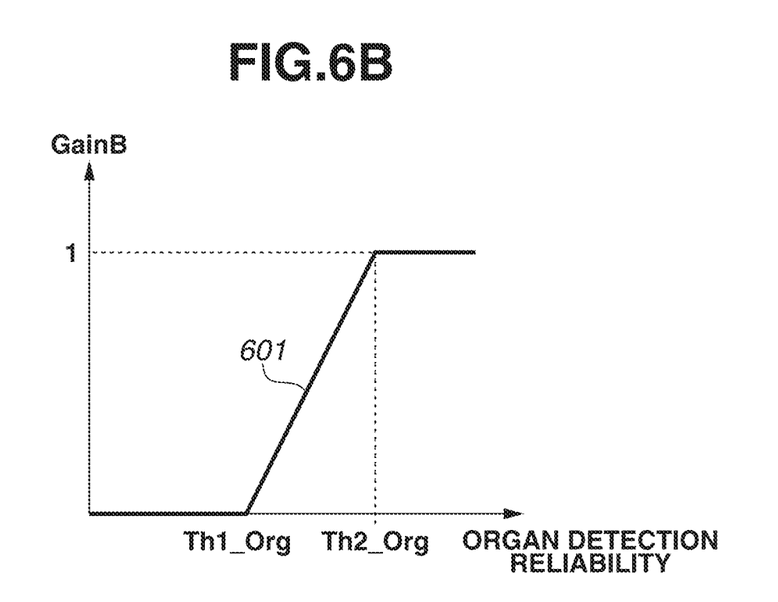

FIGS. 6A and 6B are graphs illustrating gain characteristics set when the shine correction circuit 203 calculates the shine correction amount in step S504.

FIG. 6A is a graph illustrating gain characteristics 600 when a correction gain GainA is set based on the luminance information (luminance value Y). According to the gain characteristics 600 in FIG. 6A, when the luminance value Y is equal to or lower than a predetermined threshold value Th1_Y, a predetermined initial gain is set as a correction gain. The predetermined initial gain is assumed to be, for example, the gain=0 (zero). For the gain characteristics 600, when the luminance value Y exceeds the predetermined threshold value Th1_Y, a correction gain greater than the initial gain is set and thereafter, the correction gain is set so as to rise with an increase of the luminance value Y. Incidentally, the gain characteristics 600 between the threshold value Th1_Y and a threshold value Th2_Y are set to be characteristics in which the correction gain rises while drawing a predetermined curve according to the luminance value Y. Then, when the luminance value Y reaches or exceeds the threshold value Th2_Y, the correction gain is set to the maximum value and the maximum value is made to continue thereafter. It is assumed that the maximum value is set to, for example, the gain=1. Therefore, the gain characteristics 600 of FIG. 6A are such that the correction gain is made low when the luminance value Y is low, and the correction gain is made high when the luminance value Y is high.

FIG. 6B is a graph illustrating gain characteristics 601 when a correction gain GainB is set based on the reliability information of the organ detection. According to the gain characteristics 601 in FIG. 6B, when the reliability of the organ detection is equal to or lower than a predetermined threshold value Th1_Org, a predetermined initial gain (for example, "0") is set as the correction gain. For the gain characteristics 601, when the reliability of the organ detection exceeds the predetermined threshold value Th1_Org, a correction gain greater than the initial gain is set and thereafter, the correction gain is set so as to rise with increasing reliability. Incidentally, the gain characteristics 601 between the threshold value Th1_Org and a threshold value Th2_Org are set to be characteristics in which the correction gain rises linearly with increasing reliability. Then, when the reliability of the organ detection reaches or exceeds the threshold value Th2_Org, the correction gain is set to the maximum value (for example, "1") and the maximum value is made to continue thereafter. That is, the gain characteristics 601 of FIG. 6B are such that the correction gain is made low when the reliability of the organ detection is low because of the possibility of wrong correction or over-correction, and the correction gain is made high when the reliability of the organ detection is high.

Also in step S504, the shine correction circuit 203 calculates a correction gain α for each of the blocks described above based on the correction gains GainA and GainB set as described above. The correction gain α is calculated using, for example, the following Formula (1):

$$\alpha = GainA \times GainB \quad \text{Formula (1)}$$

Further, in step S504, the shine correction circuit 203 calculates complementary colors (Skin_R', Skin_G', Skin_B') of the skin color from the skin color mean values (Skin_R, Skin_G, Skin_B) calculated in step S503 described above.

Then, the shine correction circuit 203 calculates a shine correction amount for the high luminance area (shine area) of the face area based on the complementary colors (Skin_R', Skin_G', Skin_B') of the skin color and the correction gain α calculated as described above. More specifically, the shine correction circuit 203 calculates shine correction amounts (α×Skin_R', α×Skin_G', α×Skin_B') by multiplying each of the complementary colors (Skin_R', Skin_G', Skin_B') of the skin color by the correction gain α.

When a plurality of face areas is detected, the shine correction circuit 203 similarly calculates a shine correction amount for each of the face areas. However, if, as described above, the shine correction is not made for a face area from which no organ could be detected or a face area for which the organ detection may be in error, an unnatural image with correction nonuniformity in which a face area on which the shine correction is made and a face area on which the shine correction is not made are mixed may be generated.

Thus, in step S505, the shine correction circuit 203 determines whether a plurality of face areas is detected. The processing proceeds to step S508 in a case where the shine correction circuit 203 determines that a plurality of face areas is not detected (No in step S505), that is, the number of detected face areas is one, while the processing proceeds to step S506 in a case where the shine correction circuit 203 determines that a plurality of face areas is detected (Yes in step S505).

In a case where the processing proceeds to step S508 after it is determined that the number of detected face areas is one, the shine correction circuit 203 performs the shine correction processing of subtracting the shine correction amount calculated in step S504 from signal values (R0, G0, B0) of the high luminance area (shine area) in the face area, respectively. That is, the shine correction processing in this case is expressed by the following Formula (2):

$$R1 = R0 - \alpha \times Skin\_R'$$

$$G1 = G0 - \alpha \times Skin\_G'$$

$$B1 = B0 - \alpha \times Skin\_B' \quad \text{Formula (2)}$$

Figure 7:
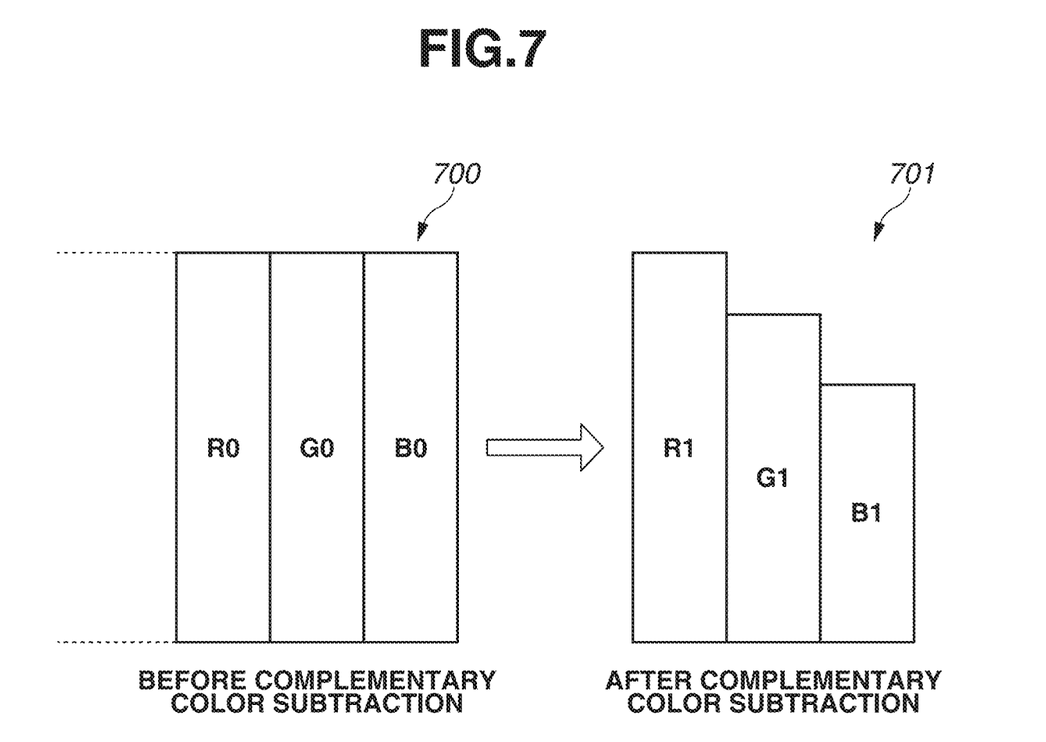
FIG. 7 is a diagram illustrating an example of RGB values before and after the correction processing.

With this shine correction processing, for example, as illustrated in FIG. 7, RGB values 701 (R1, G1, B1) after the correction in which complementary colors of the skin color are subtracted are obtained from RGB values 700 (R0, G0, B0) saturated before the correction of the high luminance area is made. As a result, an image of the face area in which the skin color of the high luminance area (shine area) is reproduced is obtained.

In a case where the processing proceeds to step S506 after it is determined that a plurality of face areas is detected in step S505 (Yes in step S505), the shine correction circuit 203 determines whether a face area with high reliability of the organ detection and a face area with low reliability of the organ detection are mixed based on the reliability information of the detection of each organ in each face area. Here, a face area with high reliability of the organ detection is a face area on which the shine correction can be made without the possibility of wrong correction or over-correction and, on the other hand, a face area with low reliability of the organ detection is a face area on which the shine correction cannot be made due to the possibility of wrong correction or over-correction.

More specifically, in a case where the reliability of the organ detection for all face areas is the threshold value Th1_Org or less or the threshold value Th2_Org or more in FIG. 6B as described above, the shine correction circuit 203 determines in step S506 that a face area with high reliability and a face area with low reliability are not mixed (No in step S506). In this case, in the shine correction circuit 203, the processing proceeds to step S508 to similarly make the shine correction using the shine correction amount calculated in step S504.

On the other hand, in a case where the reliability of the organ detection for all face areas is not the threshold value Th1_Org or less or the threshold value Th2_Org or more in FIG. 6B, the shine correction circuit 203 determines in step S506 that a face area with high reliability and a face area with low reliability are mixed (Yes in step S506). In other words, in a case where the reliability of the organ detection for at least one face area is significantly different from the reliability of the organ detection for other face areas, the shine correction circuit 203 determines that a face area with high reliability and a face area with low reliability are mixed. Then, in a case where the shine correction circuit 203 determines in step S506 that a face area with high reliability and a face area with low reliability are mixed (Yes in step S506), the processing proceeds to step S507.

In a case where the processing proceeds to step S507, the shine correction circuit 203 calculates a control value β that adjusts the shine correction amounts (α×Skin_R', α×Skin_G', α×Skin_B') calculated in step S504. Then, the shine correction circuit 203 adjusts the shine correction amounts by multiplying the shine correction amounts calculated in step S504 by the control value β.

Hereinafter, calculation processing of the control value β will be described by citing FIGS. 8A to 8C and FIGS. 9A and 9B as examples.

Figure 8A:
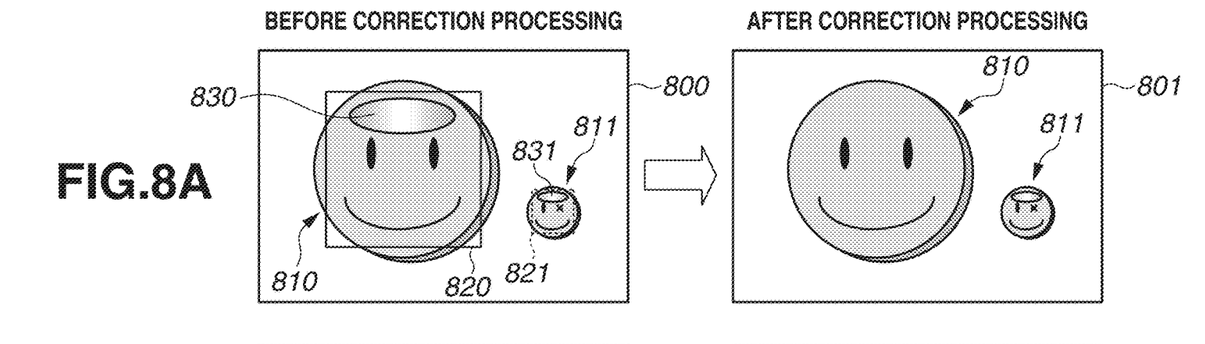
FIGS. 8A, 8B, and 8C are views illustrating the correction processing when a plurality of face areas is detected.
Figure 8B:
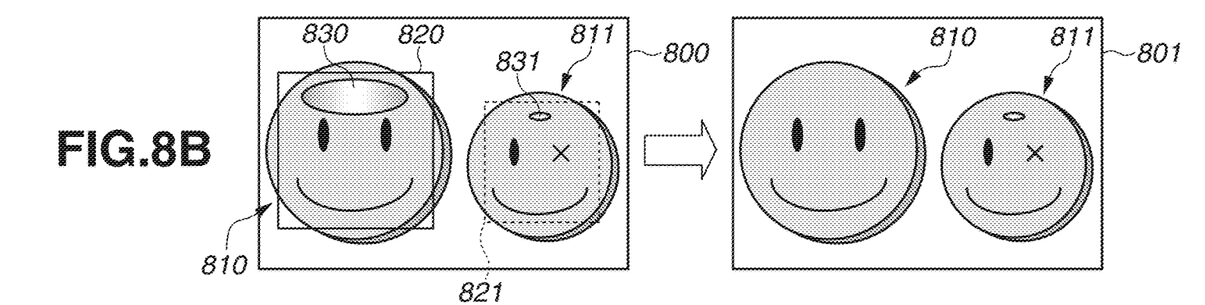
Figure 8C:
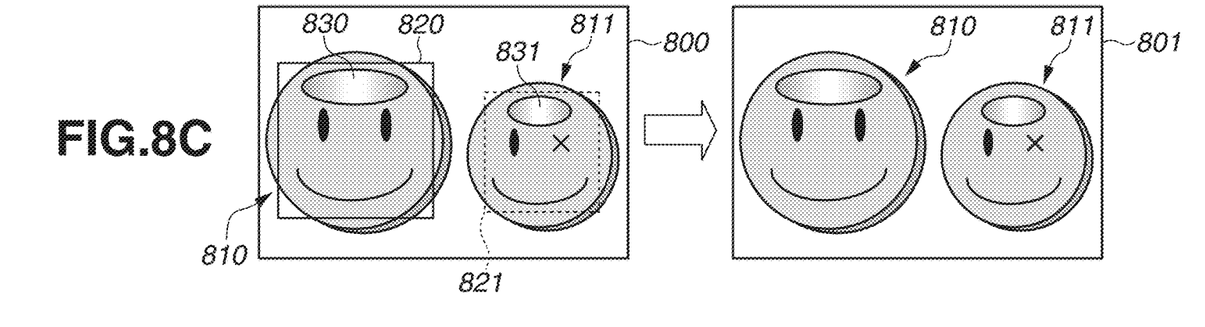

Images 800 in FIGS. 8A to 8C illustrate image examples before the shine correction processing is respectively performed thereon, and images 801 illustrate image examples after the shine correction processing has been respectively performed using the shine correction amount adjusted by the control value β.

In the image examples in FIGS. 8A to 8C, two faces, i.e., a main face 810 and a sub-face 811 are present as a plurality of detected face areas. In the present exemplary embodiment, the main face 810 is assumed to be a face area with high reliability of the organ detection described above, and a face area on which the shine correction can be made without the possibility of wrong correction and over-correction. On the other hand, the sub-face 811 is assumed to be a face area with low reliability of the organ detection and a face area on which the shine correction cannot be made due to the possibility of wrong correction or over-correction. In the image examples of FIGS. 8A to 8C, the sub-face 811 is determined to have low reliability of the organ detection because, for example, the left eye is closed and, on the other hand, the main face 810 is determined to have high reliability of the organ detection because both eyes are open. Note that examples determined to have low reliability of the organ detection are not limited to a case where one eye is closed, but also include a case where the face is in profile instead of a face seen from the front and a case where a portion of the face exceeds a field angle (only a portion of the face appears).

Also in FIG. 8A, an image example in which the size of the sub-face 811 is very small is illustrated. In this example, the size of the sub-face 811 relative to the main face 810 is assumed to be very small. In FIGS. 8B and 8C, on the other hand, image examples in which the size of the sub-face 811 is relatively large are illustrated. In these examples, the sub-face 811 is assumed to have a size close to the size of the main face 810. In FIGS. 8A to 8C, a rectangular area 820 represents the size of the main face 810 and a rectangular area 821 represents the size of the sub-face 811.

It is also assumed that, in the image examples before the shine correction processing is performed in FIGS. 8A to 8C, a shine area 830 is present in the main face 810 and a shine area 831 is present in the sub-face 811. However, in the image example before the shine correction processing is performed in FIG. 8B, the shine area 831 of the sub-face 811 is very small and an inconspicuous area. In the image example before the shine correction is performed in FIG. 8C, on the other hand, the shine area 831 of the sub-face 811 is assumed to be relatively large and a conspicuous area.

In a case where the size of the sub-face 811 is very small like in the image example of FIG. 8A, an unpleasant sensation of the image as a whole is considered to be small even if, for example, the shine correction is made only for the main face 810 and the shine correction is not made for the sub-face 811.

In a case where the size of the sub-face 811 is large like in the image example of FIG. 8C, by contrast, an unpleasant sensation of the image as a whole is considered to arise with conspicuous correction nonuniformity when, for example, the shine correction is made only for the main face 810 and the shine correction is not made for the sub-face 811.

On the other hand, in a case where the shine area 831 is very small although the sub-face 811 is large like in the image example of FIG. 8B, an unpleasant sensation of the image as a whole is considered to be small with inconspicuous correction nonuniformity even when the shine correction is made for the main face 810 and the shine correction is not made for the sub-face 811.

Thus, in the present exemplary embodiment, in a case where the main face 810 and the sub-face 811 are mixed, an image of less unpleasant sensation with inconspicuous correction nonuniformity is obtained by the adjustment of the shine correction amount calculated for the main face 810 based on the feature information of the main face 810 and the sub-face 811. More specifically, the shine correction circuit 203 first determines that the face whose reliability is high and on which the shine correction can be made is the main face 810 based on the reliability information of the organ detection among the feature information of the main face 810 and the sub-face 811. Then, the shine correction circuit 203 calculates the control value β to adjust the shine correction amount calculated for the main face 810, based on the size information (size) of the sub-face 811 and information indicating a shine amount described below of the shine area 831 of the sub-face 811 among the feature information of the sub-face 811. In the present exemplary embodiment, though details will be described below, the shine correction circuit 203 determines a control gain GainC according to the size of the sub-face 811 and a control gain GainD according to the shine amount of the shine area 831 of the sub-face 811 to calculate the control value β based on these control gains. The control gain GainC is set, as illustrated in FIG. 9A, according to the size of the sub-face 811, and the control gain GainD is set, as illustrated in FIG. 9B, according to the shine amount of the shine area 831 of the sub-face 811.

Figure 9A:
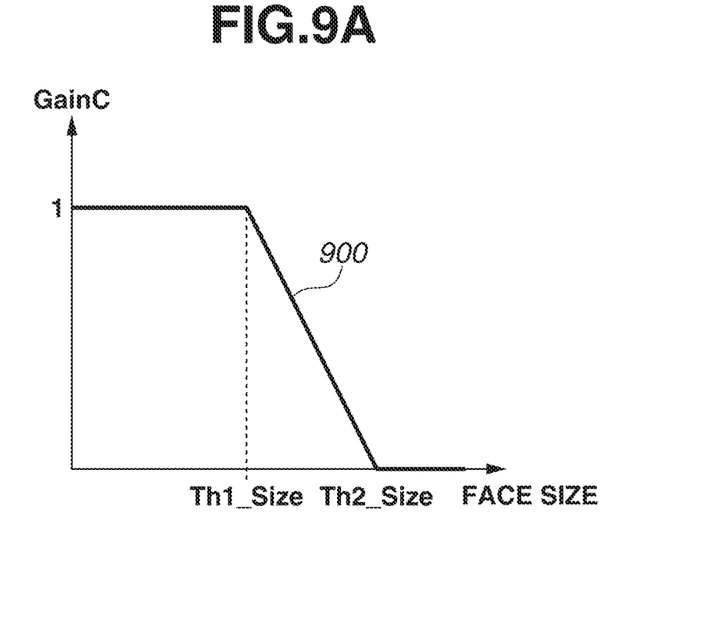
FIGS. 9A and 9B are graphs illustrating gain characteristics when the shine correction amount is adjusted.

FIG. 9A is a graph illustrating gain characteristics 900 that set, according to the size of the sub-face 811, the control gain GainC used for determining the control value β that adjusts the shine correction amount calculated for the main face 810 in step S504. According to the gain characteristics 900 in FIG. 9A, in a case where the size of the sub-face 811 is equal to or less than a predetermined first size threshold value (size threshold value Th1_Size or less), a predetermined initial gain is set as the control gain. Incidentally, the predetermined initial gain for determining the control gain GainC is set to, for example, "1". For the gain characteristics 900, in a case where the size of the sub-face 811 exceeds the first size threshold value Th1_Size, a control gain smaller than the initial gain is set and thereafter, the control gain is set to fall with an increase of the size of the sub-face 811. Incidentally, the gain characteristics 900 between the first size threshold value Th1_Size and a second size threshold value Th2_Size are set to be characteristics in which the control gain linearly falls with an increase of the size of the sub-face 811. Then, in a case where the size of the sub-face 811 reaches or exceeds the second size threshold value (size threshold value Th2_Size or more), the control gain is set to the minimum value and thereafter, the minimum value is made to continue. The minimum value is assumed to be set to, for example, "0 (zero)". That is, in the gain characteristics 900 of FIG. 9A, in a case where the size of the sub-face 811 is equal to or less than the first size threshold value Th1_Size, "1" is set as the control gain GainC. In a case where the size of the sub-face 811 is larger than the first size threshold value Th1_Size and smaller than the second size threshold value Th2_Size, the control gain of 1>GainC>0 is set, and in a case where the size of the sub-face 811 reaches or exceeds the second size threshold value Th2_Size, the control gain of GainC=0 is set.

Figure 9B:
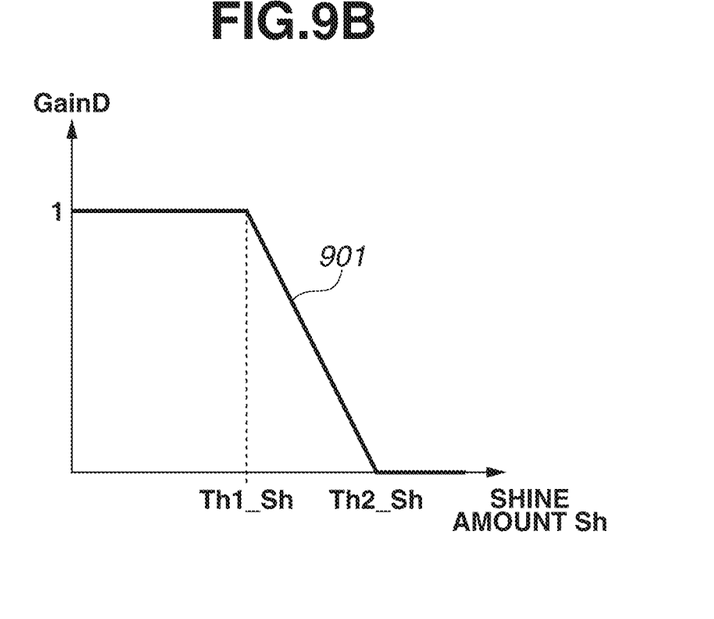

FIG. 9B is a graph illustrating gain characteristics 901 that set, according to the shine amount in the shine area 831 of the sub-face 811, the control gain GainD used for determining the control value β that adjusts the shine correction amount calculated for the main face 810 in step S504. In the present exemplary embodiment, the shine amount is a calculated amount calculated based on at least an area of a high luminance area whose luminance is equal to or more than a predetermined luminance threshold value.

Figure 10A:
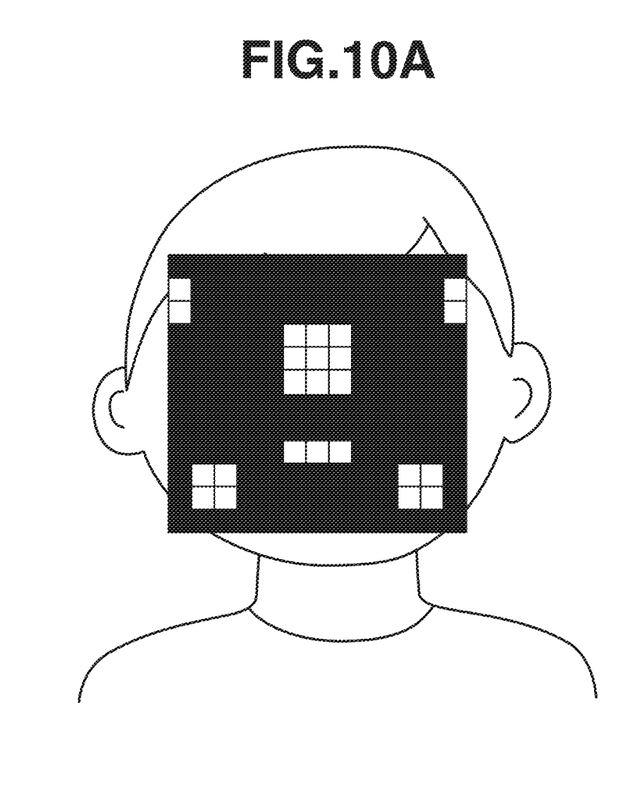
FIGS. 10A and 10B are views illustrating a high luminance area and a shine amount extracted from a face area.

FIG. 10A is a view representing each block of a high luminance area extracted from the face area. The shine correction circuit 203 calculates a shine amount Sh by counting the blocks whose luminance is equal to or more than a predetermined luminance threshold value (for example, Th1_Y in FIG. 6A or more). That is, FIG. 10A is an example in which the shine amount Sh according to an area of a high luminance area whose luminance is equal to or more than a predetermined luminance threshold value is calculated. In the example of FIG. 10A, it is assumed that white blocks represent blocks whose luminance is equal to or more than the luminance threshold value.

Figure 10B:
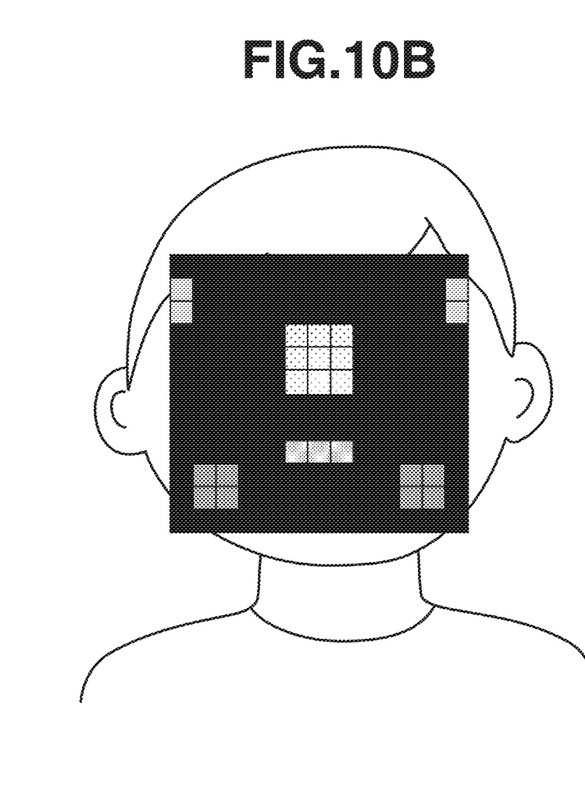

The shine correction circuit 203 can calculate a shine amount by weighted addition of the correction gain GainA according to the luminance value Y illustrated in FIG. 6A. FIG. 10B illustrates an example of blocks in which the shine amount is calculated in consideration of the correction gain GainA in FIG. 6A. In FIG. 10B, the shine amount is represented by shades of gray (number of dots) in each block, and the shine amount increases as the color of a block is closer to white and the shine amount decreases as the color of a block is closer to black. In this example, the shine amount Sh in consideration of the area and the luminance value Y of a high luminance area is calculated by integrating the correction gain GainA illustrated in FIG. 6A on a block-by-block basis. In the present exemplary embodiment, assuming that the number of blocks in a detected face area is N, the shine correction circuit 203 can calculate the shine amount Sh by the following Formula (3):

$$Sh = \sum_{n=1}^{N} GainA_n \qquad \text{Formula (3)}$$

In the gain characteristics 901 illustrated in FIG. 9B, in a case where the shine amount Sh of a high luminance area of the sub-face 811 is equal to or less than a first amount threshold value (amount threshold value Th1_Sh or less), a predetermined initial gain (for example, "1") is set as the control gain GainD. For the gain characteristics 901, in a case where the shine amount Sh of the sub-face 811 exceeds the first amount threshold value Th1_Sh, a control gain smaller than the initial gain is set and thereafter, the control gain is set to fall with an increase of the shine amount Sh of the sub-face 811. Incidentally, the gain characteristics 901 between the first amount threshold value Th1_Sh and a second amount threshold value Th2_Sh are set to be characteristics in which the control gain linearly falls with an increase of the shine amount Sh of the sub-face 811. Then, in a case where the shine amount Sh of the sub-face 811 becomes equal to or more than the predetermined second amount threshold value (amount threshold value Th2_Sh or more), the control gain is set to the minimum value ("0") and thereafter, the minimum value is made to continue. That is, in the gain characteristics 901 of FIG. 9B, in a case where the shine amount Sh of the sub-face 811 is equal to or less than the first amount threshold value Th1_Sh, "1" is set as the control gain GainD. In a case where the shine amount Sh of the sub-face 811 is larger than the first amount threshold value Th1_Sh and smaller than the second amount threshold value Th2_Sh, the control gain of 1>GainD>0 is set, and in a case where the shine amount Sh of the sub-face 811 is equal to or more than the second amount threshold value Th2_Sh, the control gain of GainD=0 is set.

Then, the control value β that adjusts the shine correction amount of the main face 810 is calculated by, for example, the following Formula (4) using the control gain GainC set in FIG. 9A described above and the control gain GainD set in FIG. 9B.

$$\beta = GainC \times GainD \qquad \text{Formula (4)}$$

Further, the shine correction circuit 203 multiplies the shine correction amounts (α×Skin_R', α×Skin_G', α×Skin_B') calculated for the main face 810 in step S504 of FIG. 5 by the control value β calculated by Formula (4). As a result, final shine correction amounts (α×β×Skin_R', α×β×Skin_G', α×β×Skin_B') are calculated. After the final shine correction amounts are calculated in step S507 as described above, the processing by the shine correction circuit 203 proceeds to step S508.

In step S508 in this case, the shine correction circuit 203 performs the shine correction processing of subtracting the final shine correction amounts calculated in step S507 from, as indicated by the following Formula (5), signal values (R0, G0, B0) of a shine area of the main face 810.

$$R1 = R0 - α \times β \times Skin\_R'$$

$$G1 = G0 - α \times β \times Skin\_G'$$

$$B1 = B0 - α \times β \times Skin\_B' \qquad \text{Formula (5)}$$

According to the present exemplary embodiment, as described above, in a case where the main face 810 whose reliability of the organ detection is high and on which the shine correction can be made, and the sub-face 811 whose reliability is low and on which the shine correction cannot be made are mixed, the shine correction is made only on the main face 810 when the size of the sub-face 811 is very small. When, for example, like in FIG. 8A, the size of the sub-face 811 is very small, an image of less unpleasant sensation with inconspicuous correction nonuniformity can be obtained even if the shine correction is made only on the main face 810 to reproduce the skin color and the shine correction is not made on the sub-face 811 having a small size.

On the other hand, when, like in FIG. 8C, the sub-face 811 is large and the shine area 831 of the sub-face 811 is also large (the shine amount is large), according to the present exemplary embodiment, an image in which correction non-uniformity is reduced can be obtained because the shine correction is not made on the main face 810. When, like in FIG. 8B, the shine area 831 is very small (the shine amount is small) although the sub-face 811 is large, according to the present exemplary embodiment, the shine correction is made only on the main face 810. That is, in a case where the shine area 831 is very small although the sub-face 811 is large, an image of less unpleasant sensation with inconspicuous correction nonuniformity is obtained even if the shine correction is made only on the main face 810 to reproduce the skin color and the shine correction is not made on the sub-face 811.

FIGS. 8A to 8C illustrate only examples in which control as to whether to make the shine correction of the main face 810 is executed. As indicated in Formula (4), however, the control value β is a value obtained by multiplying the control gains GainC and GainD. These control gains GainC and GainD can take values of, like FIGS. 9A and 9B described above, 1>GainC>0 and 1>GainD>0. Therefore, the adjustment of the shine correction amount of the main face 810 in the present exemplary embodiment includes a case where a variable adjustment according to the values of these control gains GainC and GainD is made.

In the foregoing, the exemplary embodiment of the present invention has been described, but the present invention is not limited to the exemplary embodiment described above and various modifications and alterations can be made within the scope thereof. In the exemplary embodiment described above, examples of shine correction processing on a skin-colored area of a face image as an image region of a predetermined subject are cited, but the present invention is not limited to the shine correction processing on a skin-colored area of a face image. As an example, the present invention can be applied to a case where a plurality of automobiles or the like of substantially the same body color appears in an image as predetermined subjects and high luminance areas (shine areas) of the bodies of these automobiles are corrected. In this case, a correction amount is adjusted, as described above, based on at least one of the size of image regions of the plurality of automobiles, the reliability information of detection such as the orientation of the automobiles and whether each automobile is within the field angle, and extraction information (shine amounts) of high luminance areas of the bodies. As a result, an image of less unpleasant sensation with reduced correction nonuniformity can be obtained even if image regions of a plurality of subjects are detected when the subject is not a person's face.

The above exemplary embodiments merely illustrate embodying examples when the present invention is carried out and the technical scope of the present invention should not be restrictively interpreted due to the exemplary embodiments. That is, the present invention can be carried out in various forms without deviating from its technical ideas or main features thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-103404, filed May 25, 2017, which is hereby incorporated by reference herein in its entirety.

What is claimed is:

1. An image processing apparatus comprising:
at least one processor;
at least one memory;
wherein the at least one processor functions, based on data stored in the at least one memory, as following units;
a detection unit configured to detect a face region and a part constituting the face region from an input image;
an acquisition unit configured to acquire reliability information representing reliability of the detection of the part and
a correction unit configured to extract a high luminance area from the face region to generate a correction amount of the high luminance area and to perform correction processing on the high luminance area using the correction amount;
wherein, in a case where a plurality of the face regions including a first face region having first reliability and a second face region having second reliability, the second reliability being lower than the first reliability, is detected from the input image, the correction unit adjusts the correction amount for the high luminance area of the first face region based on either a size of the second face region or extraction information of the high luminance area of the second face region.

2. The image processing apparatus according to claim 1, wherein the correction unit acquires, as the extraction information of the high luminance area of the second face region used for adjusting the correction amount, information representing at least an area of the high luminance area of the second face region.

3. The image processing apparatus according to claim 1, wherein, in a case where the size of the second face region is equal to or less than a predetermined first size threshold value, the correction unit performs the correction processing on the high luminance area of the first face region using the correction amount calculated for the first face region without adjusting the correction amount.

4. The image processing apparatus according to claim 1, wherein, in a case where the size of the second face region exceeds a predetermined first size threshold value, the correction unit adjusts the correction amount by a control gain that decreases according to the size of the second face region and performs the correction processing on the high luminance area of the first face region using the correction amount that has been adjusted.

5. The image processing apparatus according to claim 3, wherein, in a case where the size of the second face region is equal to or more than a second size threshold value, the second size threshold value being larger than the first size threshold value, the correction unit does not perform the correction processing on the high luminance area of the first face region.

6. The image processing apparatus according to claim 1, wherein, in a case where a calculated amount based on at least an area of the high luminance area of the second face region is equal to or less than a predetermined first amount threshold value, the correction unit performs the correction processing on the high luminance area of the first face region using the correction amount calculated for the first face region without adjusting the correction amount.

7. The image processing apparatus according to claim 1, wherein, in a case where a calculated amount based on at least an area of the high luminance area of the second face region exceeds a predetermined first amount threshold value, the correction unit adjusts the correction amount by a control gain that decreases according to the calculated amount and performs the correction processing on the high luminance area of the first face region using the correction amount that has been adjusted.

8. The image processing apparatus according to claim 6, wherein, in a case where the calculated amount based on at least the area of the high luminance area of the second face region is equal to or more than a second amount threshold value, the second amount threshold value being larger than the first amount threshold value, the correction unit does not perform the correction processing on the high luminance area of the first face region.

9. The image processing apparatus according to claim 1, wherein the correction processing is processing of subtracting the correction amount from a signal value of the high luminance area.

10. An image processing method for an image processing apparatus, the image processing method comprising:
  detecting a face region and a part constituting the face region from an input image;
  acquiring reliability information representing reliability of detection of the part; and
  extracting a high luminance area from the face region to generate a correction amount of the high luminance area and performing correction processing on the high luminance area using the correction amount,
  wherein, in a case where a plurality of the face regions including a first face region having first reliability and a second face region having second reliability, the second reliability being lower than the first reliability, is detected from the input image, the correction processing includes adjusting the correction amount for the high luminance area of the first face region based on either a size of the second face region or extraction information of the high luminance area of the second face region.

11. A non-transitory computer-readable storage medium storing a control program causing a computer to execute an image processing method for an image processing apparatus, the image processing method comprising:
  detecting a face region and a part constituting the face region from an input image;
  acquiring reliability information representing reliability of detection of the part; and
  extracting a high luminance area from the face region to generate a correction amount of the high luminance area and performing correction processing on the high luminance area using the correction amount,
  wherein, in a case where a plurality of the face regions including a first face region having first reliability and a second face region having second reliability, the second reliability being lower than the first reliability, is detected from the input image, the correction processing includes adjusting the correction amount for the high luminance area of the first face region based on either a size of the second face region or extraction information of the high luminance area of the second face region.

12. An image processing apparatus, comprising:
  at least one processor; and
  at least one memory, wherein the at least one processor functions, based on data stored in the at least one memory, as a following unit:
  a correction unit configured to extract a high luminance area from a face region of an input image and to perform correction processing on the high luminance area,
  wherein, in a case where the input image includes a first face region and a second face region, and in a case where the first face region has a first size and the second face region has a second size, the correction unit corrects the first face region by a first correction amount, and
  wherein, in a case where the input image includes the first face region and the second face region, and in a case where the first face region has the first size and the second face region has a third size larger than the second size, the correction unit corrects the first face region by a second correction amount smaller than the first correction amount.

13. The image processing apparatus according to claim 12, wherein the correction processing is processing of changing a color of high luminance area to be closer to a skin color of the face region.

14. An image processing method, comprising:
  extracting a high luminance area from a face region of an input image and to perform correction processing on the high luminance area,
  in a case where the input image includes a first face region and a second face region, and in a case where the first face region has a first size and the second face region has a second size, correcting the first face region by a first correction amount, and
  in a case where the input image includes the first face region and a second face region, and in a case where the first face region has the first size and the second face region has a third size larger than the second size, correcting the first face region by a second correction amount smaller than the first correction amount.

15. A non-transitory computer-readable storage medium storing a control program causing a computer to execute an image processing method for an image processing apparatus, the image processing method comprising:
  extracting a high luminance area from a face region of an input image and to perform correction processing on the high luminance area,
  in a case where the input image includes a first face region and a second face region, and in a case where the first face region has a first size and the second face region has a second size, correcting the first face region by a first correction amount, and
  in a case where the input image includes the first face region and the second face region, and in a case where the first face region has the first size and the second face region has a third size larger than the second size, correcting the first face region by a second correction amount smaller than the first correction amount.

16. The image processing apparatus according to claim 1, wherein the reliability information is based on information of an eye or a mouth of the face region.

17. The image processing apparatus according to claim 1, wherein the reliability where the eye should be located in the face region.

* * * * *